United States Patent
Watanabe et al.

(10) Patent No.: US 6,770,727 B2
(45) Date of Patent: Aug. 3, 2004

(54) PROCESS FOR PREPARING URETHANE COMPOUND FOR MEDICAL INSTRUMENTS

(75) Inventors: Tsuyoshi Watanabe, Kasugai (JP); Eri Ito, Kasugai (JP); Sadayasu Tanikawa, Kasugai (JP); Shoji Ichinohe, Gunma-ken (JP); Toshio Yamazaki, Gunma-ken (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 10/284,104

(22) Filed: Oct. 31, 2002

(65) Prior Publication Data

US 2003/0088047 A1 May 8, 2003

Related U.S. Application Data

(63) Continuation of application No. 09/608,004, filed on Jun. 30, 2000, now Pat. No. 6,495,651.

(30) Foreign Application Priority Data

Jun. 30, 1999 (JP) ............................................. 11-185023

(51) Int. Cl.$^7$ ............................................... C08G 18/22
(52) U.S. Cl. ............................ 528/54; 528/28; 528/49; 528/69; 528/75; 522/91
(58) Field of Search ............................... 528/28, 49, 54, 528/69, 75; 522/91

(56) References Cited

U.S. PATENT DOCUMENTS

| | | |
|---|---|---|
| 4,136,250 A | 1/1979 | Mueller et al. |
| 4,605,712 A | 8/1986 | Mueller et al. |
| 4,879,032 A | 11/1989 | Zemlin |
| 4,886,866 A | 12/1989 | Braatz et al. |
| 4,933,408 A | 6/1990 | Goldenberg |
| 5,070,169 A | 12/1991 | Robertson et al. |
| 5,733,945 A | 3/1998 | Simpson |
| 5,955,560 A | 9/1999 | Tanzi |

OTHER PUBLICATIONS

Saunders & Frisch; Polyurethanes I; 1962; p. 212.

Primary Examiner—Rachel Gorr
(74) Attorney, Agent, or Firm—Armstrong, Kratz, Quintos, Hanson & Brooks, LLP

(57) ABSTRACT

A process for preparing an urethane compound for medical instruments, characterized by reacting a hydroxyl compound (A) with an isocyanate compound (B) in the absence of a catalyst or in the presence of a reaction catalyst other than an organic tin compound to give an urethane compound (I). According to the process, the urethane compound showing high safety can be easily prepared, in particular, while molecular weight of the compound is controlled.

5 Claims, No Drawings

PROCESS FOR PREPARING URETHANE COMPOUND FOR MEDICAL INSTRUMENTS

This application is of continuation of Ser. No. 09/608,004, filed Jun. 30, 2000, and issued an U.S. 6,495,651

BACKGROUND OF THE INVENTION

The present invention relates to a process for preparing an urethane compound for medical instruments. More particularly, the present invention relates to a process for easily preparing an urethane compound (macromonomer) showing high safety, which is very useful for a material of medical instruments represented by optical materials such as a contact lens material and an intraocular lens material. Furthermore, the present invention relates to a process for preparing an urethane compound while molecular weight of the compound is controlled.

At present, various urethane compounds such as urethane foam, urethane rubber, adhesives and polyurethane synthetic fiber are industrially used.

In the absence of a catalyst or in the presence of a compound such as an organic metal compound or a tertiary amine, hydroxyl group is reacted with isocyanate group to form urethane bond. Particularly, from the viewpoint of high catalytic activity, the organic metal compounds are generally used. Among them, an organic tin compound is well known.

However, it is considered that the organic tin compound which is generally known as a compound showing high toxicity must not be used as a catalyst for preparation of urethane materials when the urethane materials are applied for medical instruments which are used in living organism or by contacting with living organism. The organic tin compound is recognized as a distraction substance for endocrine (environmental hormone) which is recently topical substance. Accordingly, some catalysts other than organic tin compounds are earnestly necessitated.

From the viewpoint of mechanical strength and excellent oxygen permeability, urethane bond-containing siloxane compounds (macromonomers) have been examined for the use as medical instruments, in particular, optical materials such as a contact lens material and an intraocular lens material (Japanese Unexamined Patent Publication No. 22487/1979, Japanese Unexamined Patent Publication No. 121826/1994, U.S. Pat. No. 5,451,617 and the like). However, because the siloxane compounds disclosed in these references are prepared by using the organic tin compounds almost, these siloxane compounds are not suitable as medical materials on the basis of the above reasons. Even if purification of the siloxane compound is carried out, the organic tin compounds remain within the siloxane compound.

Usually, the above urethane bond-containing siloxane compounds (macromonomers) have been prepared by finally introducing a polymerizing group in a polyfunctional polysiloxane which is a main chain through urethane bond (Japanese Unexamined Patent Publication No. 179217/1986, Japanese Unexamined Patent Publication No. 35014/1991 and the like). However, when this method is employed, it is inevitable that the polymerizing group is inestimably and repeatedly introduced in the polyfunctional polysiloxane which is a main chain through urethane bond. As a result, molecular weight of the obtained siloxane compound becomes higher than planned molecular weight. Accordingly, there is a problem that clear understanding for structure of the obtained compound is difficult.

Because the above siloxane compound becomes high viscous solution according to its molecular weight or kind of reaction components, effective purification methods for the siloxane compound are not developed. So, it is very difficult to remove impurities such as the above catalyst and by-products, and crude siloxane compound is used. Accordingly, the use of the siloxane compounds has been feared from the viewpoint of safety, including the above problems.

An object of the present invention is to provide a process for easily preparing an urethane compound, in particular, while molecular weight of the compound is controlled, in the absence of a catalyst or in the presence of a catalyst showing lower toxicity instead of the conventional organic tin compounds.

This and other objects of the present invention will become apparent from the description hereinafter.

SUMMARY OF THE INVENTION

In accordance with the present invention, there is provided a process for preparing an urethane compound for medical instruments, characterized by
reacting a hydroxyl compound (A) with an isocyanate compound (B) in the absence of a catalyst or in the presence of a reaction catalyst other than an organic tin compound to give an urethane compound (I).

According to the process of the present invention, an urethane compound showing high safety, which is very useful for a material of medical instruments represented by optical materials can be easily prepared, in particular, while molecular weight of the compound is controlled.

DETAILED DESCRIPTION

In the process for preparing an urethane compound for medical instruments, as mentioned above, the hydroxyl compound (A) is reacted with the isocyanate compound (B) to give an urethane compound (I) in the absence of the catalyst or in the presence of the reaction catalyst other than the organic tin compound in order to more accelerate this reaction.

In consideration of the use of the urethane compound as a material for medical instruments, preferable examples of the above reaction catalyst are an organic iron compound and an amine compound because of excellent safety.

Examples of the above organic iron compound are, for instance, iron (III) acetylacetonate and the like.

Examples of the above amine compound are, for instance, a cyclic tertiary amine such as triethylenediamine, an aliphatic tertiary amine such as trimethylamine or triethylamine, an aromatic tertiary amine such as dimethylaniline or triphenylamine, and the like.

Because molecular weight of the urethane compound can be more sufficiently controlled, the organic iron compound is particularly preferable.

In order to sufficiently exhibit acceleration effect for the progress of reaction, it is desired that the amount of the reaction catalyst is, on the basis of weight, at least 1 ppm, preferably at least 30 ppm of the total amount of the hydroxyl compound (A) and the isocyanate compound (B). In order to prevent removal of the-reaction catalyst from being finally difficult after the finish of reaction, it is desired that the amount of the reaction catalyst is, on the basis of weight, at most 10000 ppm, preferably at most 3000 ppm of the total amount of the hydroxyl compound (A) and the isocyanate compound (B). The amount of the reaction catalyst can be suitably adjusted within the above range according to kind of the hydroxyl compound (A) and the isocyanate compound (B) in urethane reactions (i) and (ii) as mentioned below.

In the present invention, it is desired that the above compound (I) is prepared by, for instance, the following two-step urethane reactions (i) and (ii).

At first, in the urethane reaction (i), at least one member of dihydroxyl compounds (A-2) is used as the hydroxyl compound (A) and at least one member of diisocyanate compounds (B-2) is used as the isocyanate compound (B), so the dihydroxyl compound (A-2) is reacted with the diisocyanate compound (B-2). As a result, at least two urethane bonds are formed between hydroxyl group in the dihydroxyl compound (A-2) and isocyanate group in the diisocyanate compound (B-2).

When 1 mole of the dihydroxyl compound (A-2) is reacted with 2 moles of the diisocyanate compound (B-2), two urethane bonds are formed and a compound having isocyanate groups in its both ends respectively through two urethane bonds is synthesized. On the other hand, when 2 moles of the dihydroxyl compound (A-2) is reacted with 1 mole of the diisocyanate compound (B-2), two urethane bonds are formed and a compound having hydroxyl groups in its both ends respectively through two urethane bonds is synthesized.

In the urethane reaction (i), the dihydroxyl compound (A-2) is not limited to one member and the diisocyanate compound (B-2) is also not limited to one member. So, at least two members of each compound can be used with suitable combination. Accordingly, in a compound synthesized in the urethane reaction (i), units derived from at least two members of the dihydroxyl compounds (A-2) and/or units derived from at least two members of the diisocyanate compounds (B-2) can be included.

The urethane reaction (i) may be finished only one time or repeatedly carried out stepwise. When the urethane reaction (i) is repeatedly carried out stepwise, the number of formed urethane bond is increased on the basis of the number of reaction.

Typical examples of the dihydroxyl compound (A-2) are, for instance, a hydroxyl group-containing polysiloxane compound represented by the formula (I):

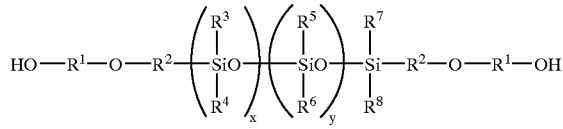

(I)

wherein each of $R^1$ and $R^2$ is independently an alkylene group having 1 to 20 carbon atoms, each of $R^3$, $R^4$, $R^5$, $R^6$, $R^7$ and $R^8$ is independently a linear alkyl group having 1 to 20 carbon atoms, a branched alkyl group having 3 to 20 carbon atoms or a cyclic alkyl group having 3 to 20 carbon atoms, which may be substituted with fluorine atom, x is an integer of 1 to 1500, y is an integer of 1 to 1499, and "x+y" is an integer of 1 to 1500; and the like.

In the above formula (I), each of $R^1$ and $R^2$ is preferably an alkylene group having 1 to 10 carbon atoms. Each of $R^3$, $R^4$, $R^5$, $R^6$, $R^7$ and $R^8$ is preferably a linear alkyl group which may be substituted with fluorine atom, having 1 to 5 carbon atoms, a branched alkyl group which may be substituted with fluorine atom, having 3 to 5 carbon atoms, or a cyclic alkyl group which may be substituted with fluorine atom, having 3 to 5 carbon atoms. Also, x is preferably an integer of 1 to 500, y is preferably an integer of 1 to 499, and "x+y" is preferably an integer of 1 to 500.

In addition, as the above dihydroxyl compound (A-2), a dihydroxyl compound having hydroxyl groups in its both ends, such as a polyalkylene glycol such as polyethylene glycol or polypropylene glycol; and the like are exemplified.

Typical examples of the diisocyanate compound (B-2) are, for instance, a diisocyanate compound represented by the formula (II):

(II)

wherein $R^{10}$ is a linear aliphatic hydrocarbon group having 1 to 20 carbon atoms, a branched hydrocarbon group having 2 to 20 carbon atoms, a cyclic aliphatic hydrocarbon group having 3 to 20 carbon atoms or an aromatic hydrocarbon group having 6 to 20 carbon atoms; and the like.

In the above formula (II), $R^{10}$ is preferably a linear aliphatic hydrocarbon group having 1 to 12 carbon atoms, a branched hydrocarbon group having 2 to 12 carbon atoms, a cyclic aliphatic hydrocarbon group having 3 to 12 carbon atoms or an aromatic hydrocarbon group having 6 to 12 carbon atoms.

Concrete examples of the diisocyanate compound (B-2) are, for instance, ethylenediisocyanate, isophoronediisocyanate, 1,6-hexamethylenediisocyanate, 1,2-toluenediisocyanate, 1,4-toluenediisocyanate, xylylenediisocyanate, bis(2-isocyanatethyl) fumarate, 1,5-naphthalenediisocyanate, cyclohexyl-1,4-diisocyanate, 4,4'-dicyclohexylmethanediisocyanate, diphenylmethane-4,4'-diisocyanate, 2,2,4-(2,4,4)-trimethylhexane-1,6-diisocyanate and the like.

It is considered that the ratio of the dihydroxyl compound (A-2) to the diisocyanate compound (B-2) in the urethane reaction (i) considerably effects for the amount of prepared by-products, the amount of residual non-reacted compounds, and molecular weight and molecular weight distribution of the aimed urethane compound.

In the urethane reaction (i), from the viewpoint of reduction of residual non-reacted isocyanate groups, it is desired that the total amount of hydroxyl group in the dihydroxyl compound (A-2) based on 1 mole of isocyanate group in the diisocyanate compound (B-2) is at least 0.4 mole, preferably at least 0.6 mole, more preferably at least 0.8 mole. From the viewpoint of reduction of residual non-reacted dihydroxyl compound (A-2) which not bonds to the diisocyanate compound (B-2) through urethane bond, it is desired that the total amount of hydroxyl group in the dihydroxyl compound (A-2) based on 1 mole of isocyanate group in the diisocyanate compound (B-2) is at most 2 moles, preferably at most 1.5 moles, more preferably at most 1.25 moles.

The amount of the dihydroxyl compound (A-2) and the diisocyanate compound (B-2) is adjusted within the above range. Then, these compounds are reacted by stirring and mixing with each other.

In the above reaction, reaction temperature and reaction time are not particularly limited and suitably adjusted according to kind and combination of each compound. In order to prevent insufficient reaction, it is desired that reaction time is at least 1 minute, preferably at least 30 minutes, and reaction temperature is at least −30° C., preferably at least 0° C. In order to prevent polymerization due to polymerizable compounds during reaction, it is desired that reaction time is at most 100 hours, preferably at most 50 hours, and reaction temperature is at most 150° C., preferably at most 100° C.

Then, in the urethane reaction (ii),
(a) the compound having isocyanate groups in its both ends obtained in the above urethane reaction (i) is reacted with at least one member of monohydroxyl compounds (A-1) as the hydroxyl compound (A) to form urethane bond; or
(b) the compound having hydroxyl groups in its both ends obtained in the above urethane reaction (i) is reacted with at least one member of monoisocyanate compounds (B-1) as the isocyanate compound (B) to form urethane bond. By each reaction, the compound (I) having at least four urethane bonds is prepared.

Because molecular weight of the aimed urethane compound can be controlled and structure of this compound can be exactly clarified, it is desired that the above two-step urethane reactions (i) and (ii) are carried out in the present invention.

In the above reaction (a), the monohydroxyl compound (A-1) to be reacted with the compound having isocyanate groups in its both ends is not limited to one member. At least two members of the monohydroxyl compounds (A-1) can be suitably used. In the above reaction (b), the monoisocyanate compound (B-1) to be reacted with the compound having hydroxyl groups in its both ends is not limited to one member. At least two members of the monoisocyanate compounds (B-1) can be suitably used. As a result, the compound (I) obtained in the reaction (a) or (b) can contain the unit derived from two members of the monohydroxyl compounds (A-1) or the unit derived from two members of the monoisocyanate compounds (B-1).

In accordance that the above urethane reaction (i) is finished only one time or repeatedly carried out stepwise, the number of urethane bond and the number of unit (block) derived from each component in the compound (I) synthesized in the urethane reaction (ii) vary. As a result, for instance, a diblock-type compound (I) is synthesized. Because chain length of each segment in the diblock-type compound (I) is controlled, various different effects can be exhibited.

Typical examples of the monohydroxyl compound (A-1) are, for instance, a compound having hydroxyl group and an active unsaturated group, such as a hydroxyalkyl (meth) acrylate, allyl alcohol, vinylbenzyl alcohol, monohydroxyl fumarate, monohydroxyl maleate or monohydroxyl itaconate; and the like.

In consideration of copolymerizability of the aimed compound (I) with the other copolymerizable compound having an active unsaturated group, among the above exemplified compounds, a hydroxyalkyl (meth)acrylate is preferable. Concrete examples of the hydroxyalkyl (meth)acrylate are, for instance, 2-hydroxyethyl (meth)acrylate, 2-hydroxypropyl (meth)acrylate, 3-hydroxypropyl (meth) acrylate, 4-hydroxybutyl (meth)acrylate and the like.

Typical examples of the monoisocyanate compound (B-1) are, for instance, a compound having isocyanate group and an active unsaturated group, such as allylisocyanate, vinylisocyanate, vinylbenzylisocyanate or 2-isocyanatethyl (meth)acrylate; and the like.

When the above reaction (b) in the urethane reaction (ii) is carried out, because the number of urethane bond in the compound (I) can be controlled and mechanical strength can be imparted to the compound (I), it is desired that a compound containing a monoisocyanate compound (B-1-1) prepared by reacting the diisocyanate compound (B-2) with the monohydroxyl compound (A-1) is used as the monoisocyanate compound (B-1). It is particularly desired that only the monoisocyanate compound (B-1-1) is used as the monoisocyanate compound (B-1).

In the reaction (a), it is desired that the ratio of the compound having isocyanate groups in its both ends to the monohydroxyl compound (A-1) is adjusted so as to react isocyanate groups in the compound having isocyanate groups in its both ends with almost neither more nor less hydroxyl groups in the monohydroxyl compound (A-1). For instance, from the viewpoint of reduction of residual non-reacted isocyanate groups, it is desired that the amount of hydroxyl group in the monohydroxyl compound (A-1) based on 1 mole of isocyanate group in the compound having isocyanate groups in its both ends is at least 1.0 mole, preferably at least 1.1 moles, more preferably at least 1.2 moles. From the viewpoint of reduction of residual non-reacted monohydroxyl compound (A-1) which not bonds to the compound having isocyanate groups in its both ends through urethane bond, it is desired that the amount of hydroxyl group in the monohydroxyl compound (A-1) based on 1 mole of isocyanate group in the compound having isocyanate groups in its both ends is at most 2.0 moles, preferably at most 1.75 moles, more preferably at most 1.5 moles.

The amount of the compound having isocyanate groups in its both ends and the monohydroxyl compound (A-1) is adjusted within the above range. Then, these compounds are reacted by stirring and mixing with each other.

In the above reaction, reaction temperature and reaction time are not particularly limited and suitably adjusted according to kind and combination of each compound. In order to prevent insufficient reaction, it is desired that reaction time is at least 1 minute, preferably at least 30 minutes, and reaction temperature is at least −30° C., preferably at least 0° C. In order to prevent polymerization due to polymerizable compounds during reaction, it is desired that reaction time is at most 100 hours, preferably at most 50 hours, and reaction temperature is at most 150° C., preferably at most 100° C.

In the reaction (b), it is desired that the ratio of the compound having hydroxyl groups in its both ends to the monoisocyanate compound (B-1) is adjusted so as to react hydroxyl groups in the compound having hydroxyl groups in its both ends with almost neither more nor less isocyanate groups in the monoisocyanate compound (B-1). For instance, from the viewpoint of reduction of residual non-reacted hydroxyl groups, it is desired that the amount of isocyanate group in the monoisocyanate compound (B-1) based on 1 mole of hydroxyl group in the compound having hydroxyl groups in its both ends is at least 1.0 mole, preferably at least 1.1 moles, more preferably at least 1.2 moles. From the viewpoint of reduction of residual non-reacted monoisocyanate compound (B-1) which not bonds to the compound having hydroxyl groups in its both ends through urethane bond, it is desired that the amount of isocyanate group in the monoisocyanate compound (B-1) based on 1 mole of hydroxyl group in the compound having hydroxyl groups in its both ends is at most 2.0 moles, preferably at most 1.75 moles, more preferably at most 1.5 moles.

The amount of the compound having hydroxyl groups in its both ends and the monoisocyanate compound (B-1) is adjusted within the above range. Then, these compounds are reacted by stirring and mixing with each other.

In the above reaction, reaction temperature and reaction time are not particularly limited and suitably adjusted according to kind and combination of each compound. In order to prevent insufficient reaction, it is desired that reaction time is at least 1 minute, preferably at least 30 minutes, and reaction temperature is at least −30° C., preferably at least 0° C. In order to prevent polymerization due to polymerizable compounds during reaction, it is desired that reaction time is at most 100 hours, preferably at most 50 hours, and reaction temperature is at most 150° C., preferably at most 100° C.

When the compound (I) is prepared by the urethane reaction (i) or (ii), in order to prevent active unsaturated groups in each compound from polymerizing with each other, it is desired that a polymerization inhibitor is suitably used.

Examples of the polymerization inhibitor are, for instance, a stable radical compound; an addition inhibitor such as oxygen, a benzoquinone derivative or a nitro compound; and the like. Hydroquinone, p-methoxyphenol and butylhydroxtoluene are preferably exemplified. It is desired that the amount of the polymerization inhibitor based on 100 parts by weight (hereinafter referred to as "part(s)") of all the compounds having an active unsaturated group is about 0.01 to 1 part.

The hydroxyl compound (A) can be reacted with the isocyanate compound (B) in the absence of a solvent or in the presence of an organic solvent.

Examples of the organic solvent are, for instance, tetrahydrofuran, benzene, toluene, acetonitrile, methylene chloride and the like.

When the organic solvent is used, in order to remove the fear that it becomes difficult to react the hydroxyl compound (A) with the isocyanate compound (B), and so, the yield of the compound (I) is lowered, it is desired that the total concentration of the hydroxyl compound (A) and the isocyanate compound (B) in the organic solvent is at least 0.01 mol/L, preferably at least 0.1 mol/L. That is, the amount (volume) of the organic solvent can be calculated according to the total concentration of the hydroxyl compound (A) and the isocyanate compound (B). A reaction solution composed of the hydroxyl compound (A), the isocyanate compound (B) and the organic solvent is sufficiently stirred or shaken so that the reaction uniformly proceeds.

In accordance with the above steps, the aimed urethane compound (I) can be prepared. After finishing the reaction for preparing the compound (I), it is desired that the compound (I) is purified by removing non-reacted compounds, compounds having lower molecular weight (by-products) and catalysts.

For purification of the compound (I), an organic solvent is preferably used. In addition, the compound (I) can be purified by using a supercritical fluid with referring to "Polymer Applications, Vol. 43, No. 11, p. 38 (1994)".

As the above organic solvent for purification, a solvent which can dissolve the non-reacted compounds, by-products and catalysts or can dissolve the compound (I) is used. Typical examples of the organic solvent are, for instance, methanol, ethanol, acetone, tetrahydrofuran, acetonitrile, methylene chloride, hexane and the like. These can be used alone or in admixture thereof. In order to more effectively purify the compound (I), a mixed solvent of hexane and methanol and a mixed solvent of hexane and acetonitrile are preferably used.

In order to sufficiently remove the non-reacted compounds, by-products and catalysts, it is desired that the amount of the organic solvent is, on the basis of the volume, at least 1/20 time, preferably at least 1/10 time of the amount of the compound (I). In order to prevent the amount of waste fluid from increasing after purification, it is desired that the amount of the organic solvent is, on the basis of the volume, at most 20 times, preferably at most 10 times of the amount of the compound (I).

As the above supercritical fluid for purification, a fluid in the supercritical state, such as carbon dioxide, ethane or propane may be cited.

Condition as to purification with the supercritical fluid varies according to molecular weight and chemical structure of the compound (I). So, the condition cannot be sweepingly determined. For instance, it is desired that treating pressure is 5 to 100 MPa, and treating temperature is 0° to 100° C.

In order to more effectively extract the compounds having lower molecular weight, an auxiliary for extraction can be used during purification of the compound (I) with the supercritical fluid. Examples of the auxiliary for extraction are, for instance, acetonitrile, methanol and the like.

According to the process of the present invention, the urethane compound showing high safety, which is very useful for a material of medical instruments represented by optical materials can be easily prepared, in particular, while molecular weight of the compound is controlled.

The process for preparing an urethane compound for medical instruments of the present invention is more specifically described and explained by means of the following Examples. It is to be understood that the present invention is not limited to the Examples, and various changes and modifications may be made in the invention without departing from the spirit and scope thereof.

EXAMPLE 1

(1) Synthesis of HEA-IPDI

With a 1 L three-necked flask of which side tubes previously substituted with nitrogen gas were equipped with Dimroth reflux condenser, a mechanical stirrer and a thermometer was charged 66.69 g (0.3 mole) of isophoronediisocyanate (hereinafter referred to as "IPDI").

Then, to IPDI in the three-necked flask was added 41.80 g (0.36 mole) of 2-hydroxyethyl acrylate (hereinafter referred to as "HEA") in which 0.0110 g of iron (III) acetylacetonate (hereinafter referred to as "FeAA") was previously dissolved.

To the mixture in the three-necked flask was added 0.220 g of p-methoxyphenol (hereinafter referred to as "MEHQ") as a polymerization inhibitor and then, the reaction solution in the three-necked flask was continuously stirred in an oil bath prescribed at 50° C. After about 3 hours, $^1$H-NMR spectrum of a sample from the reaction solution was examined and then, the aimed compound (HEA-IPDI) was recognized. Data of $^1$H-NMR spectrum are as follows:

$^1$H-NMR (CDCl$_3$, δ ppm) 2.90 (NH—CH$_2$, 2H, m) 3.02 (CH$_2$—N=C=O, 2H, s) 3.05 (Raw material, CH$_2$—N=C=O, 2H, s) 4.27–4.33 (—(O)CO—CH$_2$—, 4H, m) 4.61 (NH, 1H, s) 4.87 (NH, 1H, s) 5.84 (CH=, 1H, dd) 6.13 (CH=, 1H, dd) 6.42 (CH=, 1H, dd)

(2) Reaction of HEA-IPDI with Polydimethylsiloxane Containing Hydroxyl Groups in its Both Ends (Synthesis of compound (I))

To a reaction solution containing about 60.8 g of the above compound (HEA-IPDI) (amount of isocyanate group: 0.18 mole) in the three-necked flask was added 325.80 g (converted amount of hydroxyl group: 0.09 mole) of polydimethylsiloxane containing hydroxyl groups in its both ends (polymerization degree: 40, number average molecular weight: 3100, code name: KF-6002, made by Shin-Etsu Chemical Co., Ltd.; hereinafter referred to as "DHDMSi-40") in which 0.0330 g of FeAA was previously dissolved. Then, the reaction solution was continuously stirred in the oil bath heated to 80° C.

After about 4 hours, $^1$H-NMR spectrum and FT/IR spectrum of a sample from the reaction solution were examined. Then, structural analysis was carried out by using these spectra, so that the aimed compound (I) was recognized. Data of $^1$H-NMR spectrum and FT/IR spectrum are as follows:

$^1$H-NMR (CDCl$_3$, δ ppm) 0.06 (Si—CH$_3$, 3H, m) 0.52 (Si—CH$_2$, 2H, m) 2.91 (NH—CH$_2$, 2H, d) 3.02 (Intermediate, CH$_2$—N=C=O, 2H, s) 3.42 (—O—CH$_2$, 2H, t) 3.62 (—O—CH$_2$, 2H, m) 4.18–4.34 (—(O)CO—CH$_2$—, 6H, m) 4.54 (NH, 1H, s) 4.85 (NH, 1H, s) 5.84 (CH=, 1H, dd) 6.14 (CH=, 1H, dd) 6.43 (CH=, 1H, dd)

FT/IR (cm$^{-1}$) 1262 and 802 (Si—CH$_3$) 1094 and 1023 (Si—O—Si) 1632 (C=C) near 1728 (C=O, ester and urethane) 2227 (N=C=O)

The number average molecular weight of the compound (I) was measured by size exclusion chromatography (hereinafter referred to as "SEC"), and the amount of by-products (compounds having lower molecular weight) was calculated from the area ratio in chromatogram by SEC. The results are shown in TABLE 1.

(3) Purification of Compound (I) with Organic Solvent (n-Hexane/Acetonitrile) (Preparation of Purified Urethane Compound)

Into a 5 L separatory funnel equipped with a side tube was transferred about 400 g of the compound (I) which was previously dissolved in 2 L of n-hexane. Then, 300 mL of acetonitrile was added to the solution in the separatory funnel. After the mixture solution in the separatory funnel was stirred at about 500 rpm for 20 minutes, the mixture solution was allowed to stand. After about 1 hour, it was recognized that the contents in the separatory funnel were separated to two layers. Then, acetonitrile layer (lower layer) was removed.

Hexane layer was washed with 50 mL of acetonitrile. The wash was repeated two times. It was recognized that the hexane layer was colorless and transparent. After the acetonitrile layer was removed, the hexane layer was collected into a 1 L brown pear shaped flask of which dry weight was previously weighed, and the solvent was evaporated under the vacuum. Then, the contents in the pear shaped flask were dried overnight by using a pressure reducing dryer to give 318.49 g of a purified urethane compound. The yield of the purified compound was 83%.

$^1$H-NMR spectrum and FT/IR spectrum of the above purified urethane compound were examined. Then, structural analysis was carried out by using these spectra, so that the aimed compound was recognized. Data of $^1$H-NMR spectrum and FT/IR spectrum are as follows:

$^1$H-NMR (CDCl$_3$, δ ppm) 0.06 (Si—CH$_3$, 3H, m) 0.52 (Si—CH$_2$, 2H, m) 2.91 (NH—CH$_2$, 2H, d) 3.42 (—O—CH$_2$, 2H, t) 3.61 (—O—CH$_2$, 2H, m) 4.18–4.34 (—(O)CO—CH$_2$—, 6H, m) 4.54 (NH, 1H, s) 4.85 (NH, 1H, s) 5.84 (CH=, 1H, dd) 6.14 (CH=, 1H, dd) 6.43 (CH=, 1H, dd) FT/IR (cm$^{-1}$) 1262 and 802 (Si—CH$_3$) 1094 and 1023 (Si—O—Si) 1632 (C=C) near 1728 (C=O, ester and urethane)

The number average molecular weight of the purified urethane compound was measured by SEC, and the amount of by-products (compounds having lower molecular weight) was calculated from the area ratio in chromatogram by SEC. The results are shown in TABLE 1.

Cellular toxicity of the above compound (I), and transparency of the compound (I) and the purified urethane compound were examined. The results are shown in TABLE 1.

$^1$H-NMR analysis, FT/IR analysis, SEC analysis, evaluation of transparency and cellular toxicity test were carried out in accordance with the following methods, respectively.

(I) $^1$H-NMR Analysis $^1$H-NMR spectrum was examined under the following conditions.
Fourier Transform NMR Spectrometer:
  GEMINI2000/400BB type, made by Varian Technologies Limited
Nuclear:
  $^1$H (resonance frequency: 400.42 MHz)
Solvent:
  CDCl$_3$
Test Sample:
  About 5 to 10 w/v % CDCl$_3$ solution
Measuring Temperature:
  About 22° C.

(II) FT/IR Analysis

FT/IR spectrum was examined under the following conditions.
Infrared Spectrophotometer:
  FT/IR-8300, made by Nippon Bunko Kabushiki Kaisha
Method:
  KBr disk method (III) SEC Analysis SEC analysis was carried out under the following conditions.
SEC System:
  Made by Nippon Bunko Kabushiki Kaisha
  Column oven: 860-CO made by Nippon Bunko Kabushiki Kaisha
  Degasser: DG-980-50 made by Nippon Bunko Kabushiki Kaisha
  Pump: PU-980 made by Nippon Bunko Kabushiki Kaisha
  Detector (RI type): 830-RI made by Nippon Bunko Kabushiki Kaisha
    (UV type): SPD-10A made by SHIMAZU CORPORATION
Column:
  Ultrastyragel Plus MX 10$^3$ Å made by Waters Co.
  (two columns connected in series)
Eluent:
  Tetrahydrofuran
Calibration Curve:
  Produced by using standard polystyrene (IV) Evaluation of Transparency The test sample was observed with naked eye.

(V) Cellular Toxicity Test (Test as to Prevention for Preparation of Colony)

The test was carried out in accordance with the guideline of "Basic biological test of medical instruments and medical materials" (MEDICAL DEVICES DIVISION PHARMACEUTICAL AFFAIRS BUREAU Notification No. 99, 1995, published on Jun. 27, 1995 in Japan). Then, biological safety of the test sample was evaluated.

EXAMPLE 2

A compound (I) was prepared in same manner as in EXAMPLE 1 except that 180 g (converted amount of hydroxyl group 0.09 mole) of polydimethylsiloxane containing hydroxyl groups in its both ends (polymerization degree: 20, number average molecular weight: 2000, code name: KF-6001, made by Shin-Etsu Chemical Co., Ltd.; hereinafter referred to as "DHDMSi-20") was used instead of DHDMSi-40. Then, the same manner as in EXAMPLE 1 was repeated to give 233.7 g of a purified urethane compound. The yield of the purified compound was 81%.

Structure of the compound (I) and the purified urethane compound was examined and confirmed in the same manner as in EXAMPLE 1. Properties of the compound (I) and the purified urethane compound, and the amount of compounds having lower molecular weight (by-products) were examined in the same manner as in EXAMPLE 1. The results are shown in TABLE 1.

EXAMPLE 3

The same manner as in EXAMPLE 1 was repeated except that 77.4 g (0.3 mole) of 4,4'-dicyclohexylmethanediisocyanate (hereinafter referred to as "DCHMDI") was used instead of IPDI to give a compound (HEA-DCHMDI). Then, a compound (I) was prepared in the same manner as in EXAMPLE 1 except that HEA-DCHMDI was used instead of HEA-IPDI. Furthermore, the same manner as in EXAMPLE 1 was repeated to give 333.8 g of a purified urethane compound. The yield of the purified compound was 75%.

Structure of the compound (HEA-DCHMDI), the compound (I) and the purified urethane compound was examined and confirmed in the same manner as in EXAMPLE 1. Properties of the compound (I) and the purified urethane compound, and the amount of compounds having lower molecular weight (by-products) were examined in the same manner as in EXAMPLE 1. The results are shown in TABLE 1.

Comparative Example 1

Method Using Organic Tin Compound as Reaction Catalyst

A compound (HEA-IPDI) was prepared in same manner as in EXAMPLE 1 except that 0.011 g of dibutyltin dilaurate (hereinafter referred to as "BSnL") was used instead of FeAA. Then, a compound (I) was prepared in the same manner as in EXAMPLE 1 except that 0.033 g of BSnL was used instead of FeAA. Furthermore, the same manner as in EXAMPLE 1 was repeated to give 373.5 g of a purified urethane compound. The yield of the purified compound was 86%.

Structure of the compound (HEA-IPDI), the compound (I) and the purified urethane compound was examined and confirmed in the same manner as in EXAMPLE 1. Properties of the compound (I) and the purified urethane compound, and the amount of compounds having lower molecular weight (by-products) were examined in the same manner as in EXAMPLE 1. The results are shown in TABLE 1.

Then, the amount of tin contained in the purified urethane compound was quantitated by polarographic analysis method. As a result, the amount of tin contained in the purified urethane compound was 40 ppm on the basis of weight. Now, the amount of tin used for starting synthesis of the compound (I) was about 100 ppm on the basis of weight.

To the mixture in the three-necked flask was added 0.09 g of MEHQ as a polymerization inhibitor and then, the reaction solution in the three-necked flask was continuously stirred in an oil bath prescribed at 50° C. After about 3 hours, $^1$H-NMR spectrum of a sample from the reaction solution was examined and then, the aimed compound (HEA-IPDI) was recognized. Data of $^1$H-NMR spectrum are as follows:
$^1$H-NMR (CDCl$_3$, δ ppm) 2.90 (NH—CH$_2$, 2H, m) 3.02 (CH$_2$—N=C=O, 2H, s) 3.05 (Raw material, CH$_2$—N=C=O, 2H, s) 4.27–4.33 (—(O)CO—CH$_2$—, 4H, m) 4.61 (NH, 1H, s) 4.87 (NH, 1H, s) 5.84 (CH=, 1H, dd) 6.13 (CH=, 1H, dd) 6.42 (CH=, 1H, dd)

(2) Reaction of HEA-IPDI with Polydimethylsiloxane Containing Hydroxyl Groups in its Both Ends (Synthesis of Compound (I))

To a reaction solution containing about 50 g of the above compound (HEA-IPDI) (amount of isocyanate group: 0.1 mole) in the three-necked flask was added 271.50 g (converted amount of hydroxyl group: 0.075 mole) of DHDMSi-40 in which 0.30 g of TEDA was previously dissolved. Then, the reaction solution was continuously stirred in the oil bath at 50° C.

TABLE 1

| Ex. No. | Kind of reaction catalyst | Kind of compound | Number average molecular weight | Amount of compound having lower molecular weight (% by weight) | Transparency | Cellular toxicity |
|---|---|---|---|---|---|---|
| 1 | FeAA | Compound (I) | 4600 | 23 | Colorless and transparent | Negative |
|  |  | Purified compound | 5800 | 0.6 | Colorless and transparent |  |
| 2 | FeAA | Compound (I) | 3400 | 21 | Colorless and transparent | Negative |
|  |  | Purified compound | 4400 | 1.2 | Colorless and transparent |  |
| 3 | FeAA | Compound (I) | 4700 | 27 | Colorless and transparent | Negative |
|  |  | Purified compound | 5900 | 2.2 | Colorless and transparent |  |
| Com. Ex. No. 1 | BSnL | Compound (I) | 4500 | 22 | Colorless and transparent | Positive |
|  |  | Purified compound | 5800 | 6.4 | Colorless and transparent |  |

From the results shown in TABLE 1, it can be understood that according to the process of the present invention in EXAMPLES 1 to 3, the urethane compound showing low toxicity can be easily prepared while molecular weight of the compound is controlled. In addition, it can be understood that the amount of the compound having lower molecular weight (by-product) is considerably small in EXAMPLES 1 to 3.

To the contrary, it can be understood that according to the process wherein the organic tin compound is used as the reaction catalyst in COMPARATIVE EXAMPLE 1, the amount of tin contained in the aimed purified urethane compound is large, toxicity of the purified urethane compound is high and the amount of the compound having lower molecular weight (by-product) is large.

EXAMPLE 4

(1) Synthesis of HEA-IPDI

With a 1 L three-necked flask of which side tubes previously substituted with nitrogen gas were equipped with Dimroth reflux condenser, a mechanical stirrer and a thermometer was charged 33.33 g (0.15 mole) of IPDI.

Then, to IPDI in the three-necked flask was added 17.40 g (0.15 mole) of HEA in which 0.06 g of triethylenediamine (hereinafter referred to as "TEDA") was previously dissolved.

After about 6 hours, $^1$H-NMR spectrum and FT/IR spectrum of a sample from the reaction solution were examined. Then, structural analysis was carried out by using these spectra, so that the aimed compound (I) was recognized. Data of $^1$H-NMR spectrum and FT/IR spectrum are as follows:
$^1$H-NMR (CDCl$_3$, δ ppm) 0.06 (Si—CH$_3$, 3H, m) 0.52 (Si—CH$_2$, 2H, m) 2.91 (NH—CH$_2$, 2H, d) 3.02 (Intermediate, CH$_2$—N=C=O, 2H, s) 3.42 (—O—CH$_2$, 2H, t) 3.61 (—O—CH$_2$, 2H, m) 4.18–4.34 (—(O)CO—CH$_2$—, 6H, m) 4.54 (NH, 1H, s) 4.85 (NH, 1H, s) 5.84 (CH=, 1H, dd) 6.14 (CH=, 1H, dd) 6.43 (CH=, 1H, dd)
FT/IR (cm$^{-1}$) 1262 and 802 (Si—CH$_3$) 1094 and 1023 (Si—O—Si) 1632 (C=C) near 1728 (C=O, ester and urethane) 2227 (N=C=O)

The number average molecular weight of the compound (I) was measured in the same manner as in EXAMPLE 1. As a result, the number average molecular weight was 4300.

(3) Purification of Compound (I) with Organic Solvent (n-Hexane/Methanol) (Preparation of Purified Urethane Compound)

Into a 5 L separatory funnel equipped with a side tube was transferred about 300 g of the compound (I) which was previously dissolved in 2 L of n-hexane. Then, 300 mL of distilled water was added to the solution in the separatory funnel. After the mixture solution in the separatory funnel was stirred at about 500 rpm for 20 minutes, the mixture solution was allowed to stand. After about 1 hour, it was recognized that the contents in the separatory funnel were separated to two layers. Then, water layer (lower layer) was removed.

Then, 300 mL of methanol was added to hexane layer in the separatory funnel, and after the mixture solution in the separatory funnel was stirred at about 500 rpm for 20 minutes, the mixture solution was allowed to stand. After about 1 hour, it was recognized that the contents in the separatory funnel were separated to two layers. Then, methanol layer (lower layer) was removed.

Hexane layer was washed with 50 mL of methanol. The wash was repeated two times. After the methanol layer was removed, the hexane layer was collected into a 1 L brown pear shaped flask of which dry weight was previously weighed, and the solvent was removed by a rotating evaporator. Then, the contents in the pear shaped flask were dried overnight by using a pressure reducing dryer to give 220 g of a purified urethane compound. The yield of the purified compound was 70%.

$^1$H-NMR spectrum and FT/IR spectrum of the above purified urethane compound were examined. Then, structural analysis was carried out by using these spectra, so that the aimed compound was recognized. Data of $^1$H-NMR spectrum and FT/IR spectrum are as follows:

$^1$H-NMR (CDCl$_3$, δ ppm) 0.06 (Si—CH$_3$, 3H, m) 0.52 (Si—CH$_2$, 2H, m) 2.91 (NH—CH$_2$, 2H, d) 3.42 (—O—CH$_2$, 2H, t) 3.61 (—O—CH$_2$, 2H, m) 4.18–4.34 (—(O)CO—CH$_2$—, 6H, m) 4.54 (NH, 1H, s) 4.85 (NH, 1H, s) 5.84 (CH=, 1H, dd) 6.14 (CH=, 1H, dd) 6.43 (CH=, 1H, dd) FT/IR (cm$^{-1}$) 1262 and 802 (Si—CH$_3$) 1094 and 1023 (Si—O—Si) 1632 (C=C) near 1728 (C=O, ester and urethane)

The number average molecular weight of the purified urethane compound was measured in the same manner as in EXAMPLE 1. As a result, the number average molecular weight was 6000.

Cellular toxicity of the above compound (I) was examined in the same manner as in EXAMPLE 1. As a result, the compound (I) showed negative. So, it can be understood that the urethane compound in EXAMPLE 4 shows lower toxicity.

In addition to the ingredients used in the Examples, other ingredients can be used in the Examples as set forth in the specification to obtain substantially the same results.

What is claimed is:

1. A process for preparing a urethane compound for medical instruments comprising the steps of
a) preparing a urethane compound by reacting at least one hydroxyl compound and at least one isocyanate compound in the presence of an organic iron compound, and
b) removing the organic iron compound from the urethane compound obtained in the step a).

2. The process for preparing a urethane compound of claim 1 wherein the organic iron compound is represented by the following formula (I)

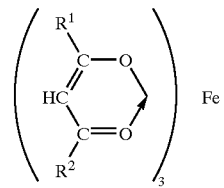

in which each of R$^1$ and R$^2$ is methyl group.

3. The process for preparing a urethane compound of claim 1 wherein the organic iron compound is removed by using an organic solvent or a supercritical fluid.

4. The process for preparing a urethane compound of claim 1 wherein the urethane compound obtained in the step b) has a radical polymerizable ethylenic unsaturated group.

5. The process for preparing a urethane compound of claim 1 wherein at least one of the hydroxyl compound or at least one of the isocyanate compound has a siloxane structure having a repetition number of 1 to 1500.

* * * * *